May 4, 1937.                F. C. WAPPLER                2,079,233
                          TELESCOPIC INSTRUMENT
                          Filed Aug. 16, 1933              2 Sheets-Sheet 2
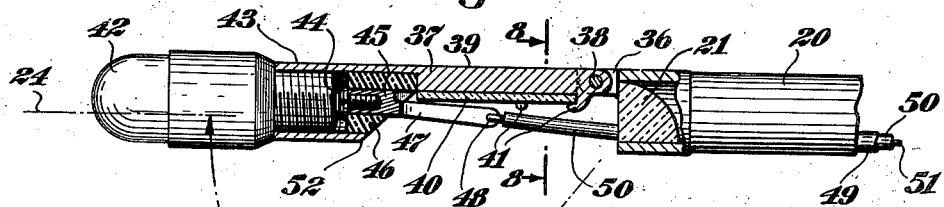
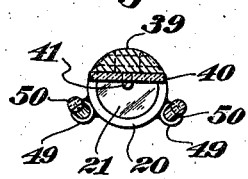
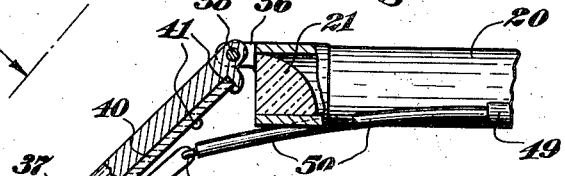
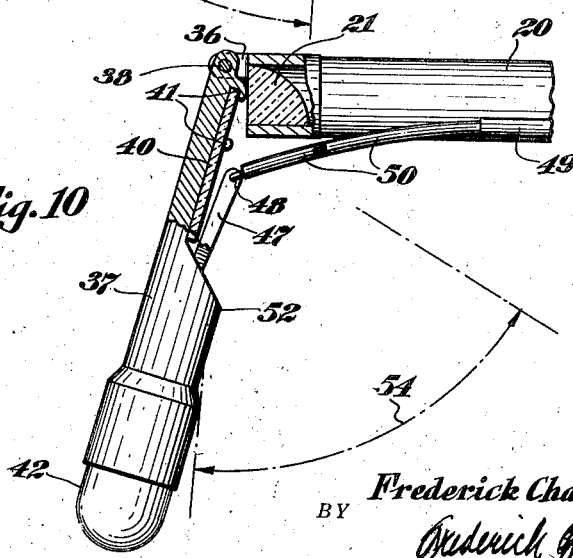
INVENTOR
Frederick Charles Wappler,
BY
ATTORNEY Patented May 4, 1937

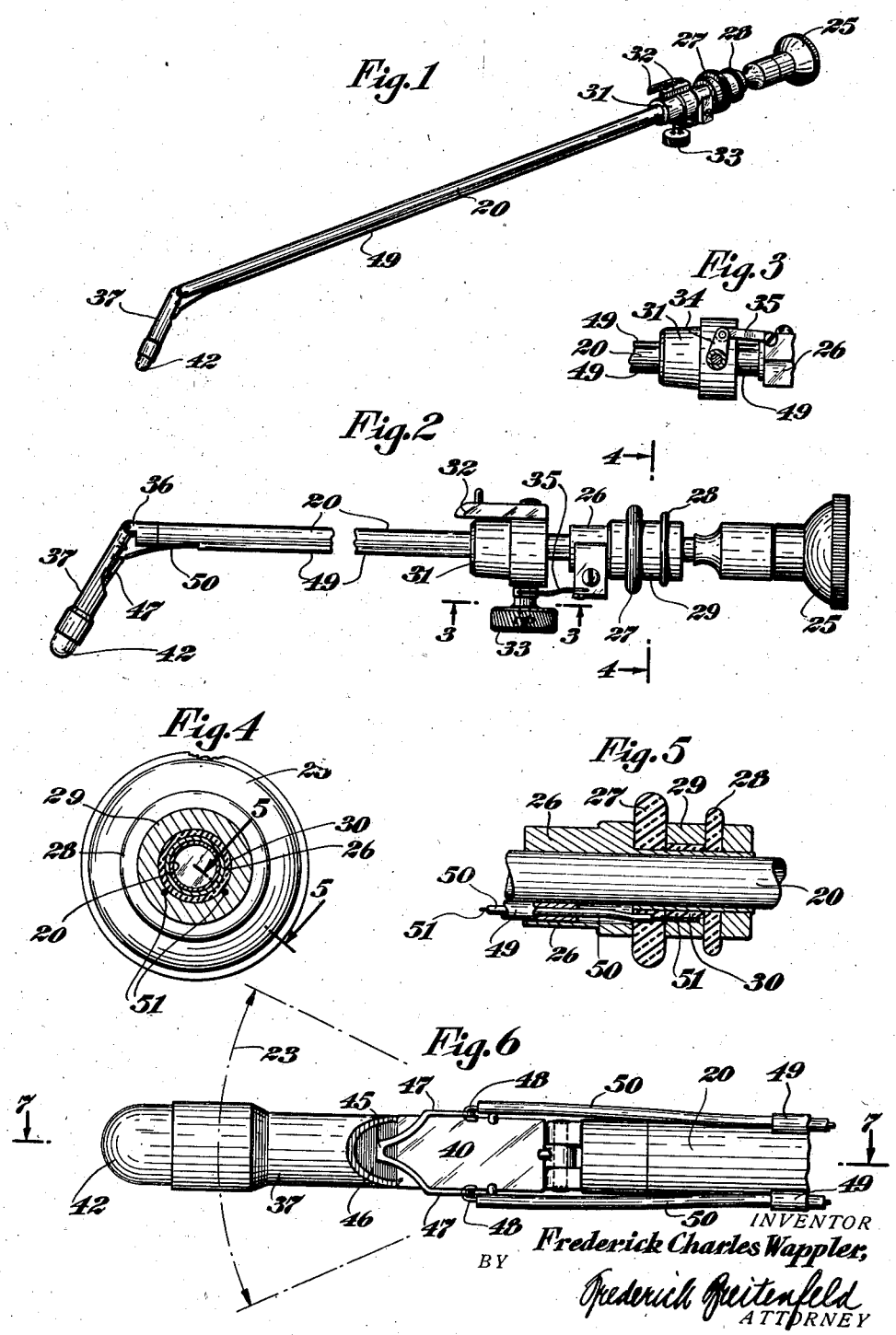

2,079,233

UNITED STATES PATENT OFFICE 2,079,233

TELESCOPIC INSTRUMENT

Frederick Charles Wappler, New York, N. Y.

Application August 16, 1933, Serial No. 685,361

10 Claims. (Cl. 128—7)

My present invention relates generally to surgical instruments, and has particular reference to telescopes.

It is a general object of my invention to provide an improved telescope, adapted to be used either alone or in association with operative instruments, for the purpose of viewing, under illumination, interior portions of the human body.

It is a more particular feature of my invention to provide an improved device which will permit visibility of a greatly increased field, and, more especially, a field which includes within its scope a rearward range of vision lying alongside of the telescope itself.

By means of my present invention, I aim to provide an instrument which embodies the advantageous characteristics of the type of telescope illustrated in United States Letters Patent No. 1,680,491, issued August 14, 1928; and my present instrument is, in a sense, an improvement over that type of telescope in so far as it permits a wider and more adjustable range of vision.

The salient characteristic of the foregoing patented type of telescope lies in the fact that a single telescopic tube is provided at its forward end with an extension of reduced diameter, the extension lying in its entirety within the space bounded by the peripheral side surfaces of the tube, and an objective lens of particular characteristics being mounted in the tube behind said extension. The field of vision commanded by such an instrument is forwardly oblique, the inner boundary of the range skirting the extension, and the latter accommodating a lamp which affords efficient illumination of the field.

In accordance with my present invention, a telescopic instrument of the foregoing general character, and having the same general advantageous features, is slightly modified and improved and is coupled with an adjustable arrangement which permits a lateral and even a rearward illuminated field of vision to be brought within the range of the objective.

Thus, it is a feature of my present invention to provide a telescopic tube commanding a forwardly oblique field of vision, and carrying at its forward end a pivotable extension which normally skirts the inner boundary of said range, but which may be adjusted so as to render a mirror (carried by the extension) effective to reflect into the telescope a substantially rearward field of vision. In providing a construction of this type, it has been necessary to provide a novel and unique manner of supply electric current to a lamp carried by the extension; and it is a feature of my invention to provide a means, independent of the pivot arrangement, for operating the lamp.

I am aware of prior uses of mirrors and the like for controlling or modifying the field of vision of a telescopic instrument, but it is a characterizing feature of my invention to provide a mirror which is pivoted directly to the forward end of the telescopic tube, and which normally lies in its entirety within the space bounded by the peripheral side surfaces of the tube.

I achieve the foregoing objects, and such other objects as may hereinafter appear or be pointed out, in the manner illustratively exemplified in the accompanying drawings, wherein—

Figure 1 is a perspective view of a telescopic instrument embodying the features of my present invention;

Figure 2 is a side view of the instrument of Figure 1, with parts broken away and other parts shown in section;

Figure 3 is a fragmentary cross-sectional view taken substantially along the line 3—3 of Figure 2;

Figure 4 is a cross-sectional view taken substantially along the line 4—4 of Figure 2;

Figure 5 is an enlarged cross-sectional view taken substantially along the line 5—5 of Figure 4;

Figure 6 is an enlarged bottom view of the forward portion of the instrument of Figure 1, with the extension in normal position;

Figure 7 is a cross-sectional view taken substantially along the line 7—7 of Figure 6;

Figure 8 is a cross-sectional view taken substantially along the line 8—8 of Figure 7;

Figure 9 is a view similar to Figure 7, showing the extension in an adjusted position; and Figure 10 is a view similar to Figures 7 and 9, showing a further adjustment of the extension so as to bring a rearward field of vision into the range of the telescope.

The tube 20 contains a lens system of suitable character, which includes an eccentric objective lens 21 (Figures 7-9) at the forward end of the tube, this objective having the ability to command a forwardly oblique field of vision whose boundaries are approximately represented by the arrows 22 of Figure 7 and the arrows 23 of Figure 6. The field of vision is substantially conical, and the apex of the cone is disposed toward the thicker side of the lens 21 and not toward the longitudinal central axis of the tube 20 as would ordinarily be the case. The inner boundary 24 of the range of vision is substantially parallel to the axis of the tube 20, as shown most clearly in Figure 7.

At its rear end, the tube 20 terminates in the eyepiece 25. Forwardly of the eyepiece, and slidably mounted on the tube 20 for longitudinal reciprocation, is the sleeve member 26, shown most clearly in Figures 2, 4, and 5. This sleeve member carries the two spaced insulating discs 27 and 28, between which a conductive ring 29 is mounted, this ring being adapted to be engaged by a suitable clamp or the like for establishing an electrical connection with a suitable source of electric current. The ring 29 is insulated from the member 26 and from the tube 20 by virtue of the rings 27 and 28, together with an additional sleeve or lining member 30 which underlies the ring 29 and which is of insulating material.

Near the rear end of the tube 20, I also prefer to provide the connecting plug 31 which may be of any suitable character and which is adapted to enter a suitable connection sleeve provided on the usual type of endoscopic tube into which the present type is adapted to be inserted. A forked element 32 cooperates with a suitable means on the connection sleeve to hold the present device in firm association with the endoscopic tube.

For a purpose presently to be described, the reciprocation of the sleeve member 26 is provided for by any suitable mechanism, such as that illustrated in Figures 2 and 3, in which I have illustratively shown a rotatable knob 33 mounted on the plug 31, the rotative movements of which effect longitudinal reciprocation of the member 26 through the intermediary of the crank 34 and the connecting link 35.

At the forward end of the tube 20, and overlying the thinner portion of the objective lens 21, I provide a bearing member 36 to which the rear end of a forward extension 37 is pivoted, as at 38. This extension is substantially cylindrical in exterior contour, except that at the rear portion thereof the cylinder is cut away to provide merely a segmentary cross-section, as shown in Figure 8. The outer surface or contour 39 of this portion of the extension forms a smooth continuation of the peripheral side surface of the tube 20 when the extension is in the normal position shown in Figures 6 and 7.

On the flat inner side of the rear portion of the extension 37, I mount a mirror or equivalent reflecting member 40, and it is to be noted upon viewing Figures 7 and 8 that this mirror is normally disposed in its entirety within the space bounded by the side surfaces of the tube 20, and that, furthermore, the mirror normally lies alongside of, and just beyond, the inner boundary 24 of the range of vision.

The mirror is conveniently held in position by means of tabs 41 or the like.

Forwardly of the mirror, I provide an illuminating lamp 42 which is removably mounted in a lamp socket 43, the latter being provided at its base with a center contact 44 which I have illustratively shown in the form of a stud threaded rearwardly into a conductive member 45. The latter forms, in effect, a portion of the center contact 44, and projects rearwardly from the forward portion of the extension through the insulating plug or bushing 46. The member 45 terminates at its rear end in the two spaced arms 47.

To accomplish a pivotal movement of the extension from the position of Figure 7 into the positions of Figures 9 and 10, I provide a pair of control rods which are hooked at their forward ends 48 to the arms 47, respectively, and which extend rearwardly through tunnels or passageways 49 carried by the tube 20.

At their rear ends, the control rods are connected to the reciprocable sleeve 26, whereby manipulations of the knob 33 will effect advancement and retraction of the control rods, thereby controlling the adjustment of the extension 37 into the various positions illustrated in Figures 7–10.

In accordance with my invention, I avoid the necessity for attempting to supply current to the lamp 42 through the pivot arrangement at the forward end of the tube 20, and I accomplish this objective by supplying the current through the intermediary of the control rods above mentioned. More particularly, I provide each control rod of conductive material, and I ensheath it throughout its length in insulation 50. Each of the guide tubes 49 extends rearwardly through the plug 31 and into a suitable longitudinal bore provided in the sleeve 26, and each ensheathed control rod extends rearwardly through the entire extent of the corresponding guide tube 49, so that the rear bared end of the control rod may be accommodated in a suitable opening provided therefor in the conductive ring 29. This arrangement is shown most clearly in Figure 5, in which the rear end of one of the control rods is designated by the reference numeral 51.

From the foregoing, it will be obvious that an electrical connection for an illuminating lamp may be easily established by merely connecting one terminal of a suitable current source to the ring 29 and by grounding the other terminal or connecting it in some suitable manner to the body of the instrument. It will also be observed that the reciprocal movements of the control rods, and of the sleeve 26, for the purpose of pivoting the forward extension, do not affect or impair the maintenance of this electrical connection. Each of the control rods thus serves a dual function.

It will be understood that one control rod may suffice, both for controlling the movements of the extension and for conducting current to the lamp, but I prefer to employ a pair of rods because of the enhanced staunchness and reliability of operation which this arrangement provides for.

Upon viewing Figure 6, it will be noted that the arms 47, as well as the forward portions of the control rods, are arranged along the opposite side edges of the mirror 40, respectively. This keeps these elements out of the range of vision at all times.

Under ordinary circumstances, with the device arranged as shown in Figures 6 and 7, the field of vision is substantially the same as that which is illustrated and discussed in greater detail in the aforementioned Patent No. 1,680,491. The only portion of the extension which falls within one edge of the range of vision is the inner edge portion 52 of the lamp socket. This infringes upon the range of vision by a very slight extent which is not at all objectionable; and even this slight infringement may, if desired, be avoided by simply making the lamp socket slightly smaller.

When it is desired to obtain a lateral, or even a rearward, view of the body cavity in which the instrument may be positioned, it is merely necessary to manipulate the knob 33 so as to swing the extension into the desired oblique position, e. g., the position of Figure 9 or that of Figure 10. When the parts are in the relationship of Figure 9, the lateral illuminated field of vision which is reflected into the objective 21 by the mirror 40 is substantially conical and is substantially defined by the limits designated by the arrows 53 of Figure 9.

When the parts are adjusted into the relationship of Figure 10, the rearward illuminated field of vision which is reflected into the range of the telescope is substantially of the extent represented by the arrows 54.

In neither of the positions of Figure 9 or Figure 10, nor in any intermediate positions, is the effective field of vision impaired or impeded While it may appear, superficially, from the present drawings, that the control rods or the arms 47 might infringe upon the field, this is not the case, and it will be readily understood when it is borne in mind that the field of vision is in each case substantially conical and that the arms 47 and the control rods are so arranged and constructed as to lie outside of the bounds of the visible field.

It will be also observed, especially in Figures 9 and 10, that the swinging movements of the forward extension are accompanied by a covering of the thinner portion of the lens 21. This does not in the least interfere with a clear, unimpeded vision at any time, because of the peculiar characteristics of this type of lens, as more fully set forth in the issued patent hereinbefore referred to. The effective light entering the lens 21 enters it through the thicker portion.

The advantages of the present telescopic device need hardly be elaborated upon. It may be used in the conventional manner for obtaining a clear, illuminated vision of a forwardly oblique field; and it may, at the same time, by a slight adjustment, be rendered capable of bringing into view an illuminated field which lies laterally and also rearwardly of the objective itself. The field is in each case thoroughly illuminated, although the lamp is always in such a position that its rays do not directly enter the eye of the observer. Furthermore, the insertion and removal of the present device into and from an endoscopic instrument is greatly facilitated by the compact arrangement of the various parts. No space substantially larger than that which would ordinarily be occupied by the tube 20 itself need be provided for.

In certain instances, the present device may be inserted directly into a body cavity without the aid of an outer endoscopic tube.

It will be understood that the proportions of the several parts may be varied to suit differing requirements. The mirror may be made longer, for example, in which case a more extended view is rendered visible, especially when the parts are in the relationship of Figure 9. Or, the mirror may be shaped other than rectangular; and the lamp may be arranged in any other convenient manner in association with the pivotable extension.

In general, it will be obvious that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In an instrument of the character described, a telescopic tube, a pivot bearing arranged over a portion of the front end of the tube, an objective in the tube behind said bearing and partially covered thereby and commanding a forwardly oblique range of vision through the uncovered area alongside of said bearing, a forward extension having its rear end pivotally journaled in said bearing, said extension normally skirting the inner boundary of said range, a mirror carried by said extension, and means for pivoting said extension to interpose the mirror into said range so as to reflect into the objective of said telescope a field of vision lying to the rear thereof.

2. In an instrument of the character described, a telescopic tube having an objective which commands a forwardly oblique range of vision, a mirror pivoted at its rear end to the front end of said tube, said mirror normally lying in a plane which skirts the inner boundary of said range and disposed wholly within the space bounded by the extended peripheral surface of said tube, and means for pivoting the mirror into said range so as to render it effective to reflect into said objective a field of vision lying to the rear thereof.

3. In an instrument of the character described, a telescopic tube having an objective which commands a forwardly oblique range of vision, a forward extension pivoted to the front end of said tube and normally skirting the inner boundary of said range, a lamp carried at the front end of said extension, a mirror carried by the extension behind said lamp, and means for pivoting said extension to interpose the mirror into the range of vision of said objective and thereby render the mirror effective to reflect into said objective an illuminated field of vision lying to the rear thereof.

4. In an instrument of the character described, a telescopic tube, a pivot bearing arranged over a portion of the front end of the tube, an objective in the tube behind said bearing and commanding a forwardly oblique range of vision through the uncovered area alongside of said bearing, a forward extension having its rear end pivotally journaled in said bearing, said extension normally skirting the inner boundary of said range, a lamp carried at the front end of said extension, a mirror carried by the extension behind said lamp, and means for pivoting said extension to interpose the mirror into said range so as to reflect an illuminated rearward field of vision into the telescope.

5. In an instrument of the character described, a telescopic tube commanding a forwardly oblique range of vision, a forward extension pivoted to the front end of said tube and normally skirting the inner boundary of said range, a lamp and a mirror carried by said extension, said extension being pivotable to interpose the mirror into said range, and means independent of the pivot connection for supplying electric current to said lamp.

6. In an instrument of the character described, a telescopic tube commanding a forwardly oblique range of vision, a forward extension pivoted to the front end of said tube and normally skirting the inner boundary of said range, a lamp and a mirror carried by said extension, said extension being pivotable to interpose the mirror into said range, and means independent of the pivot connection for supplying electric current to said lamp, said means comprising a socket for the lamp, a terminal projecting rearwardly from said socket, and a conductive member connected at the front end to said terminal and extending rearwardly along the tube, said member being arranged adjacent to a side edge of the mirror.

7. In an instrument of the character described, a telescopic tube commanding a forwardly oblique range of vision, a forward extension pivoted to the front end of said tube and normally skirting the inner boundary of said range, a lamp and a mirror carried by said extension, said extension being pivotable to interpose the mirror into said range, and means independent of the pivot connection for supplying electric current to said lamp, said means comprising a socket for the lamp, a terminal projecting rearwardly from said socket and terminating in a pair of spaced arms, and a pair of conductive members connected at their front ends to said arms, respectively, said members skirting the side edges of the mirror, respectively, and extending rearwardly along the tube.

8. In an instrument of the character described, a telescopic tube commanding a forwardly oblique range of vision, a forward extension pivoted to the front end of said tube and normally skirting the inner boundary of said range, a lamp and a mirror carried by said extension, means for pivoting the extension to interpose the mirror into said range, and means for supplying electric current to said lamp through the intermediary of said pivoting means.

9. In an instrument of the character described, a telescopic tube commanding a forwardly oblique range of vision, a forward extension pivoted to the front end of said tube and normally skirting the inner boundary of said range, a lamp and a mirror carried by said extension, means for pivoting the extension to interpose the mirror into said range, said means comprising a control rod articulated at its forward end to the extension and extending rearwardly along the tube, and means for supplying electric current to said lamp through said control rod.

10. In an instrument of the character described, a telescopic tube commanding a forwardly oblique range of vision, a forward extension pivoted to the front end of said tube and normally skirting the inner boundary of said range, a lamp and a mirror carried by said extension, means for pivoting the extension to interpose the mirror into said range, said means comprising a control rod articulated at its forward end to the extension and extending rearwardly along the tube, and means for supplying electric current to said lamp through said control rod, said last-named means comprising a lamp socket, a socket terminal electrically connected to said rod, and a binding post at the rear of the tube electrically connected with said rod.

FREDERICK CHARLES WAPPLER.